US012203318B2

(12) United States Patent
Fumanelli

(10) Patent No.: US 12,203,318 B2
(45) Date of Patent: Jan. 21, 2025

(54) SECURITY CONTAINER CASSETTE FOR BANKNOTES OR VALUES FOR ATM (AUTOMATED TELLER MACHINE)

(71) Applicant: M.I.B. S.r.L., Milan (IT)

(72) Inventor: Giuseppe Ezio Fumanelli, Melzo (IT)

(73) Assignee: M.I.B. S.r.L., Milan (IT)

( * ) Notice: Subject to any disclaimer, the term of this patent is extended or adjusted under 35 U.S.C. 154(b) by 0 days.

(21) Appl. No.: 18/145,527

(22) Filed: Dec. 22, 2022

(65) Prior Publication Data

US 2023/0175308 A1 Jun. 8, 2023

Related U.S. Application Data

(63) Continuation of application No. 16/847,700, filed on Apr. 14, 2020, now Pat. No. 11,566,465.

(30) Foreign Application Priority Data

Jul. 4, 2019 (IT) ........................ 102019000010845
Nov. 27, 2019 (IT) ........................ 102019000022299

(51) Int. Cl.
*E05G 1/12* (2006.01)
*E05G 1/00* (2006.01)
*G07F 19/00* (2006.01)

(52) U.S. Cl.
CPC ............... *E05G 1/005* (2013.01); *E05G 1/12* (2013.01); *G07F 19/205* (2013.01)

(58) Field of Classification Search
CPC .. E05G 1/005; E05G 1/12; E05G 1/06; G07F 19/205; Y10T 70/7876; Y10T 70/8676
USPC ............................ 109/27, 57; 70/408, 456 R
See application file for complete search history.

(56) References Cited

U.S. PATENT DOCUMENTS

| | | | |
|---|---|---|---|
| 5,156,272 | A | 10/1992 | Bouchard et al. |
| 5,216,965 | A | 6/1993 | Liptak et al. |
| 8,117,973 | B1 | 2/2012 | Frank |
| 8,534,207 | B2 | 9/2013 | Villiger |
| 8,631,748 | B2 | 1/2014 | Tavares |
| 10,676,980 | B2 | 6/2020 | Grant et al. |
| 11,113,428 | B1 | 9/2021 | Totah et al. |

(Continued)

FOREIGN PATENT DOCUMENTS

| | | | |
|---|---|---|---|
| DE | 202018105701 U1 | 3/2019 | |
| EP | 1519329 A2 | 3/2005 | |

(Continued)

OTHER PUBLICATIONS

The Italian Search Report issued for corresponding Italian Patent Application No. 102019000010845, completed on Dec. 16, 2019, three pages.

*Primary Examiner* — Suzanne L Barrett
(74) *Attorney, Agent, or Firm* — Vorys, Sater, Seymour and Pease LLP

(57) ABSTRACT

A security container cassette for banknotes or values for Cash machines, ATM, and the like is provided, defining an internal volume and including: a first container arranged in the internal volume and close to an external portion of the security container cassette and banknotes and values, the first container having an internal volume separated from the external portion of the security container cassette by at least one separating wall, including passage windows or weakened upper portions, the first container being designed to contain marking fluid.

20 Claims, 4 Drawing Sheets

(56) References Cited

U.S. PATENT DOCUMENTS

| | | | | |
|---|---|---|---|---|
| 11,566,465 | B2 * | 1/2023 | Fumanelli | ............ G07D 11/125 |
| 2002/0029728 | A1 | 3/2002 | Walker | |
| 2003/0005882 | A1 | 1/2003 | Fumanelli | |
| 2009/0126606 | A1 | 5/2009 | Flood | |
| 2015/0191960 | A1 | 7/2015 | Robson | |
| 2018/0140068 | A1 | 5/2018 | Yokote et al. | |

FOREIGN PATENT DOCUMENTS

| | | | |
|---|---|---|---|
| EP | 1653037 | A1 | 5/2006 |
| GB | 1138104 | A | 12/1968 |
| IT | MI20010946 | A1 | 11/2002 |

* cited by examiner

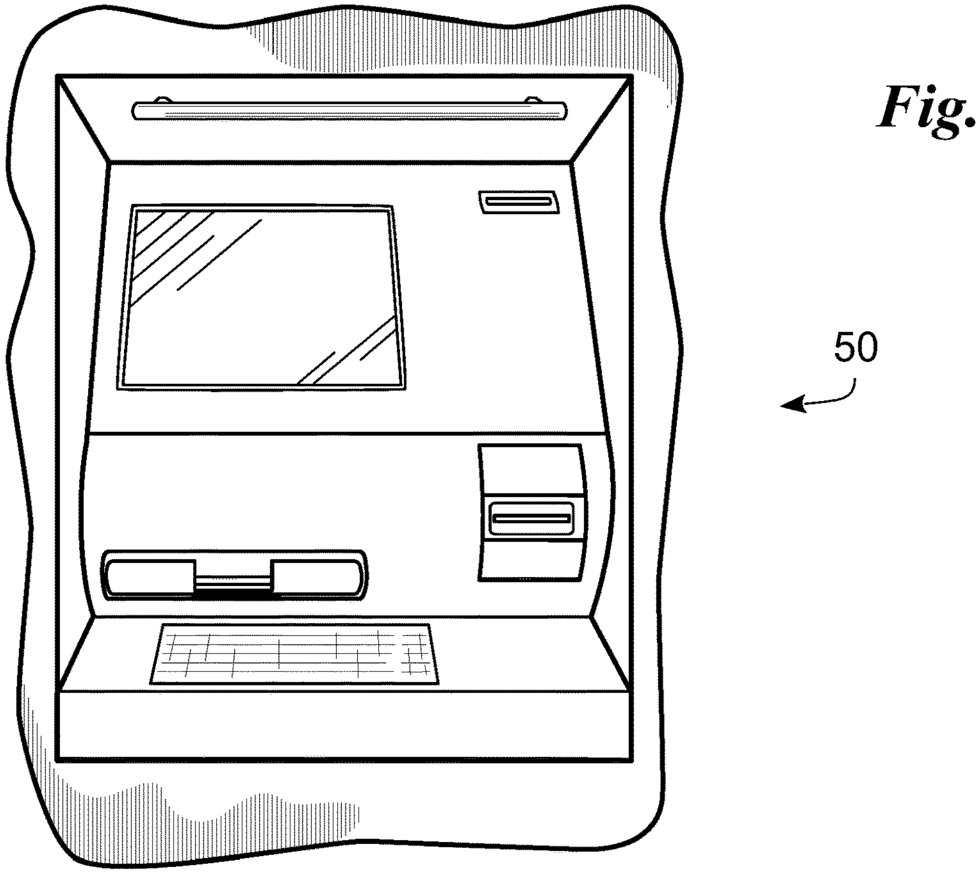
*Fig. 1*
*Fig. 2*
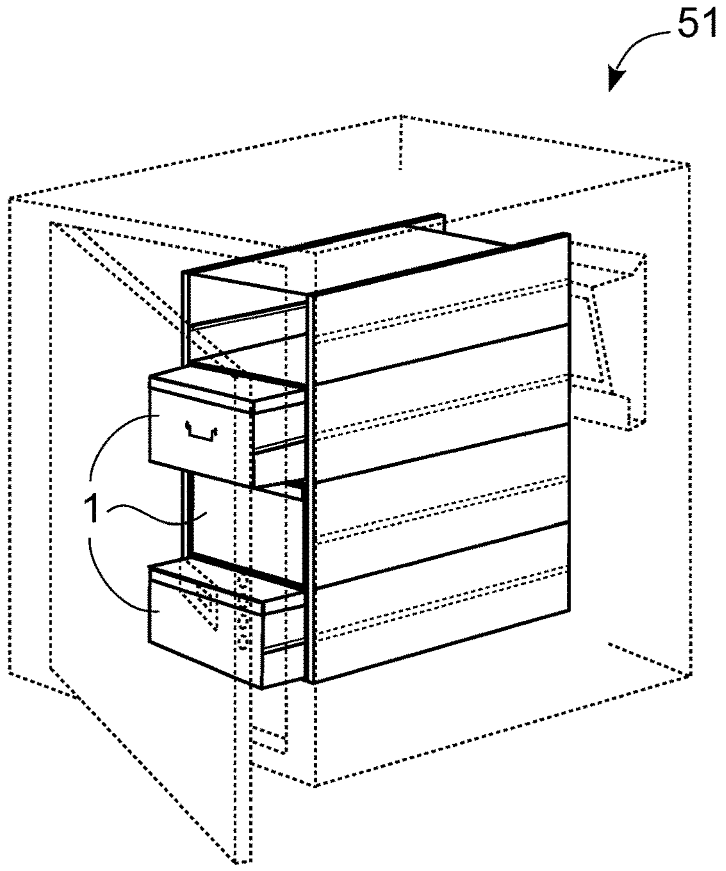

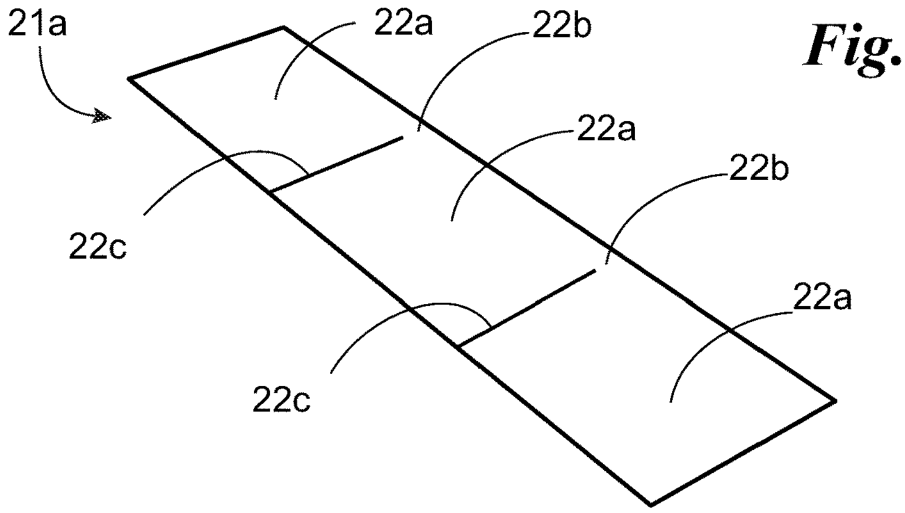
*Fig. 5*
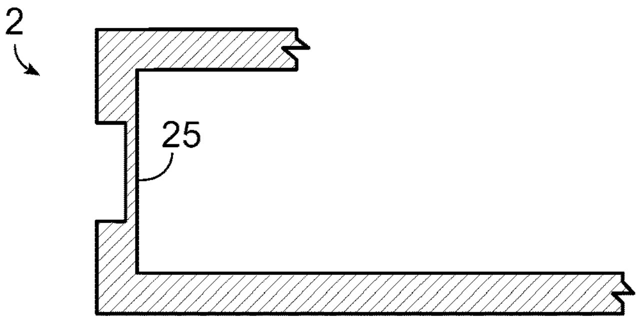
*Fig. 6*
*Fig. 8*
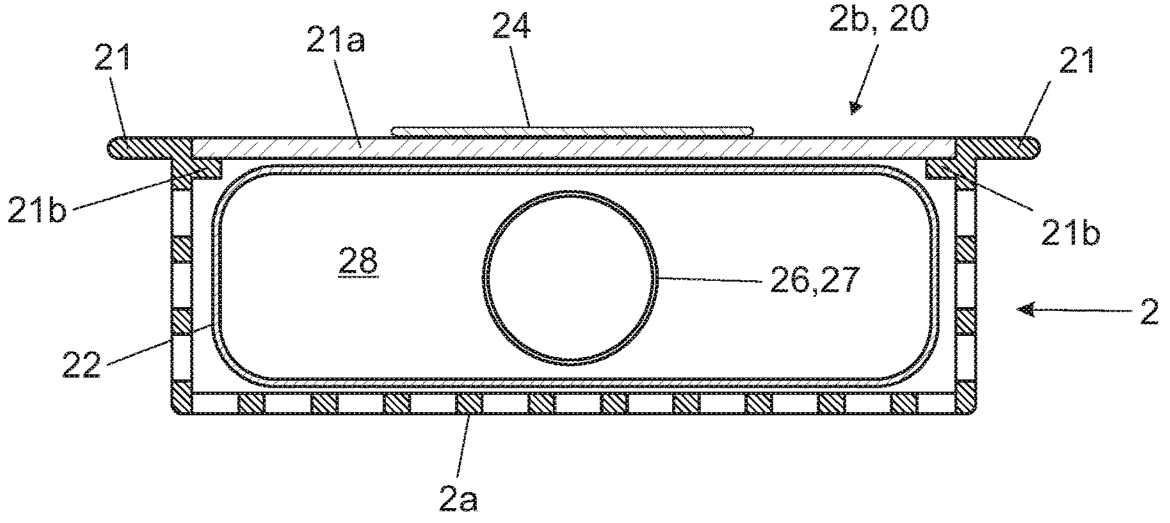

SECURITY CONTAINER CASSETTE FOR BANKNOTES OR VALUES FOR ATM (AUTOMATED TELLER MACHINE)

FIELD OF THE INVENTION

This invention relates to a security container cassette for banknotes or values, in particular a draw for Cash machines, ATM, and the like comprising a first container within an internal volume and close to an external portion of said security container cassette designed to contain marking fluid.

DESCRIPTION OF THE PRIOR ART

Different types of security containers for banknotes or values are currently known, such as cassettes, ATM cash machines, or similar containers for transporting banknotes and other items.

Said containers are exposed, in particular in the case of cassettes for Cash machines, ATM, and the like to theft and burglary attempts.

In order to address these drawbacks, active invalidating marking systems have been designed to mark the banknotes contained in the cassettes. These comprise burglary sensors that, in the event of an alarm, activate means designed to mark the banknotes and values contained in the cassettes with indelible ink so that they cannot be used.

For example, similar marking means are described in the Italian patent IT MI2001A000946, of the applicant itself.

These active marking systems are very effective. In the case of burglaries using explosives, however, these create significant shock waves, and in many cases the banknotes in the cassettes can be ejected or separated from the marking system during the explosion, rendering the marking system ineffective.

The patent application DE202018105701U1, filed in 2018, seeks to address said drawback by providing a cassette that includes a pliable tank with marking ink inside, placed near the banknotes.

In case of bursting, said tank breaks, automatically marking the banknotes and values in the cassettes, making them unusable.

A similar solution was already implemented in many different cassettes and containers, and was, for example, described in patent documents: EP1653037A1, published in 2006, GB1138104A, published in 1968, and U.S. Pat. No. 5,156,272A, published in 1992.

These devices, while improving the situation, do not completely solve the technical problem.

In fact, the described pliable tank of marking ink positioned above the banknotes is not always broken by the explosion and, especially when a limited quantity of explosives, or a low potential explosive, is used.

At other times, the tank breaks in places where there are no banknotes.

In this context, the technical task underlying this invention is to devise a security container cassette for banknotes and values that is capable of substantially overcoming at least some of the above-mentioned drawbacks.

SUMMARY OF THE INVENTION

In the context of said technical task, it is an important purpose of the invention to provide a security container cassette for banknotes or values that is designed to mark the banknotes and values even when explosive substances of the solid, gaseous, slow, or fast type are used, including in combination or sequence.

The technical task and specified purposes are achieved with a security container cassette for banknotes or values for Cash machines, ATM, and the like, defining an internal volume and comprising: a first container arranged in the internal volume and close to an external portion of the security container cassette, the first container having an internal volume separated from the external portion of the security container cassette by at least one separating wall, the first container being designed to contain marking fluid and being arranged close to the banknotes and values, the security container cassette being characterised in that the separating wall comprises passage windows or weakened upper portions.

BRIEF DESCRIPTION OF THE DRAWINGS

The characteristics and benefits of the invention will be clarified in the following detailed description of some preferred embodiments of the invention, with reference to the accompanying drawings, wherein:

FIG. 1 schematizes an external view of a Cash machine, ATM, and the like including a passive marking system;

FIG. 2 schematizes the internal portion of a Cash machine, ATM, and the like including a passive marking system;

FIG. 5 shows a detail of the security container cassette for banknotes and values according to the invention;

FIG. 6 shows a detail of the security container cassette for banknotes and valuables according to the invention;

FIG. 8 shows a third embodiment, in cross-section, of a portion of the security container cassette for banknotes and values according to the invention.

DESCRIPTION OF THE PREFERRED EMBODIMENTS

Figure 3:
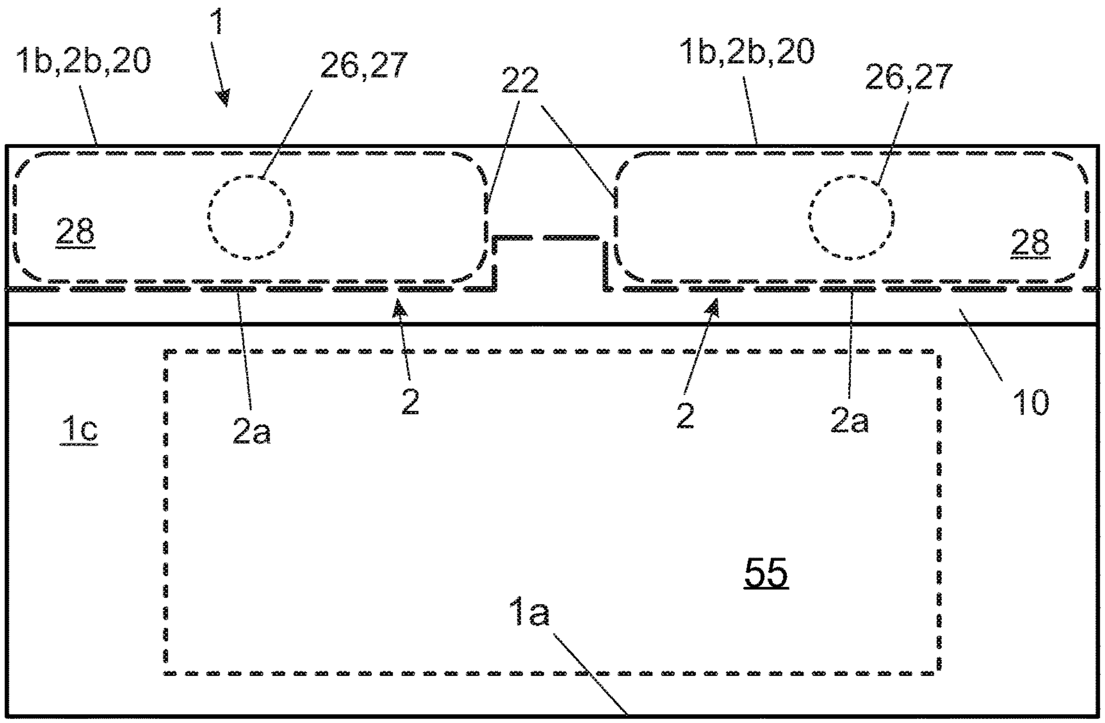
FIG. 3 schematizes a front view of the inside of a security container cassette for banknotes and values according to the invention, in a first condition.

In this document, when measurements, values, shapes, and geometric references (such as perpendicularity and parallelism) are associated with words like “approximately” or other similar terms, such as “almost” or “substantially”, they shall be understood as except for errors of measurement or imprecisions due to errors of production and/or manufacturing and, above all, except for a slight divergence from the value, measurement, shape, or geometric reference with which it is associated. For example, if associated with a value, such terms preferably indicate a divergence of no more than 10% of the value itself.

Furthermore, when used, terms, such as “first”, “second”, “higher”, “lower”, “main”, and “secondary” do not necessarily identify an order, relationship priority, or relative position, but they can simply be used to distinguish different components more clearly from one another.

Unless otherwise stated, the measurements and data reported in this text shall be considered as performed in International Standard Atmosphere ICAO (ISO 2533:1975).

With reference to the figures, the reference number 1 indicates, as a whole, the security container cassette for banknotes and values according to the invention.

The security container cassette 1 preferably consists of a cassette for Cash machines, ATM, and the like 50.

The security container cassette 1 defines an internal volume 1*c* for said banknotes and values. The latter are preferably arranged in the central portion of the same internal volume 1*c* and occupy, in normal section, most of the internal volume 1*c*.

The security container cassette 1 comprises perimeter boundary walls comprising a base 1*a* and an upper wall 1*b*, preferably opposite and parallel to said base 1*a*. Said perimeter boundary walls thus define the internal volume 1*c* of the cassette 1.

The upper wall 1*b* can, alternatively, be arranged laterally, or at the base as well, or in other ways. In addition the upper wall 1*b* is, appropriately, a peripheral wall of the security container cassette 1, i.e. a wall bordering the external environment in relation to the internal volume 1*c* of the security container cassette 1. More preferably, the upper wall 1*b* is part of the lid 10 of the security container cassette 1.

The security containers 1 also have a suitably, basically parallelepiped shape.

In particular, the banknotes 55 and the values are designed to be housed inside the container cassettes 1 on the base 1*a*.

The container cassettes 1 preferably comprise at least one first container 2 designed to contain marking fluid and defining an internal volume 28. Each first container 2 is preferably housed, or defined, inside a container cassette 1, near, and preferably in contact with, the upper wall 1*b*. In addition, said upper wall 1*b* may also structurally form part of the first container 2.

Each first container 2 is, thus, preferably arranged close to the banknotes and values 55, suitably above them.

Preferably, each security container 1 comprises one or two first containers 2 that are parallel and basically arranged above the banknotes.

Each first container 2 comprises, suitably, a lower portion 2*a* facing the banknotes and values.

Structurally, the lower portion 2*a* is, preferably, at least partially rigid. It is also, preferably, permeable to fluids at least on the side facing the banknotes and values.

In particular, it can be made of metal or polymer sheets comprising holes and openings.

The lower portion 2*a* may also comprise inward-facing cutting elements for the second container 22 described below.

The security container cassette 1 also comprises, preferably, a second container 22 for marking fluid, which is fluid-tight and contained in said first container 2. Said second container 22 is preferably of the pliable type and can easily be ruptured in case of pressurisation from explosions or the like. It can be, for example, made from one or more membranes with low mechanical strength, for example polyethylene, and with a thickness in the order of tenths of millimetres or other. Portions or the whole of the second container 22 can be integrated and of a single piece with the perimeter walls of the cassette 1 and/or of the first container 2.

In addition, the second container 22 can be divided into several main portions 22*a*, which are preferably longitudinal. Said main portions 22*a* are preferably in reciprocal fluidic connection.

The main portions 22*a* are also preferably connected to each other, in fluidic connection, by passage portions 22*b* of the container itself. Said passage portions 22*b* preferably have a lower passage section, e.g. 80%-90%, than the sections inside the main portions 22*a*.

The passage portions 22*b* are preferably defined by passage reducers 22*c* inside the second container 22. The passage reducers 22*c* can simply consist of welds inside the second container 22 between two opposite flaps, as illustrated in FIG. 5. Alternatively, or in addition to what is described, the lower portion 2*a* of at least one first container 2 may comprise weakened lower portions (not illustrated and, for example, similar to the weakened upper portions 20*a* described and illustrated below), placed close or so they adhere to the banknotes, designed to open in the event of an explosion.

Said weakened lower portions may be sacrificial lightenings made by milling, or portions made of different materials such as glass, thin wafers made of polymer material and the like, or through holes covered in low strength material. The weakened lower portions are, preferably, two portions made of brittle material.

The weakened lower portion may consist entirely of a glass sheet covering a large part of the lower surface of the first container 2.

The weakened lower portion may, alternatively, consist of glass elements, preferably a plurality and preferably circular, covering only one portion of the lower surface of the first container 2. Said weakened lower portions preferably consist of breakable elements surrounded by welds or gaskets preferably consisting of breakable wafers housed in bas-reliefs or recesses, to avoid interfering with the banknotes, and formed along the lower wall 2*a*.

The weakened lower portion can, alternatively, exclusively consist of bas-reliefs or recesses made along the lower wall. In the latter case, or even in the previous cases, the first containers 2 and, in particular, the lower wall 2*a*, are made of polymer material, preferably polyethylene.

In the example in FIG. 6, the first containers 2 also, preferably, comprise collapsible milling cuts or weakened side portions 25.

These weakened lower portions, by their very nature, rupture when explosions and the like occur, so that the marking fluid is poured directly onto the banknotes and values without the need for sensors and the like. The weakened lower portions are preferably present along the whole length of the first container 2, which, preferably, in its turn extends, preferably, along the whole length of the first container 2. Each first container 2 preferably comprises said weakened portions.

In addition, each first container 2 preferably comprises an upper portion 2*b* designed to separate the internal volume 28 of the first container 2 from its external volume. In addition, the upper portion 2*b* is preferably arranged facing the upper wall 1*b* of the container cassette or is integrated into the structure of the container cassette 1 itself, so that the two walls are structurally a single element. The upper portion 2*b* is, thus, preferably placed, in use, on top of the container cassette 1, usually consisting of the lid 10, or, alternatively, it could be placed at a side wall.

In any case, the upper portion 2*b* and the upper wall 1*b* together define a separating wall 20, i.e. a wall designed to separate the internal volume 28 of the first container 2 from the external volume of the container cassette 1. The separating wall 20, as described, can therefore consist of two basically parallel walls 2*b* and 1*b*, preferably arranged very close together, or a single wall ideally forming a single wall of both the first container 2 and the container cassette 1.

Advantageously, and preferably, the separating wall 20 comprises passage windows or weakened upper portions (20*a*).

The weakened upper portions 20*a* can, therefore, be through holes, either in the upper portion 2*b* and the upper wall 1*b* or in the single wall forming both. Alternatively, they can be mechanical lightenings consisting of milling cuts, or portions made of different materials such as glass, plastic, silicone, and the like, or through holes covered in low strength material, for example an adhesive tape 24 made of polymer material or paper, or polyethylene, or something else. These contrivances are present in both the upper portion 2*b* and the upper wall 1*b* or in the single wall forming both.

The weakened upper portions 20*a*, rupture when pressurised, by their very nature, during explosions and the like, so the shock wave of the explosion directly pressurises the marking fluid inside the first container 2 without delay or the need for sensors and the like. The weakened upper portions 20*a* are preferably present along the whole length of the first container 2, which, preferably, in its turn extends, preferably, along the whole length of the first container 2.

They are also, preferably, formed from circular holes comprising a solid element in the centre connected to the edges of the hole by spokes, in particular three or four of them.

Each first container 2 preferably comprises said weakened upper portions 20*a*.

Each first container 2 preferably has a prismatic shape, more preferably, a parallelepiped shape.

The security container cassette 1 may also comprise a sheet, preferably rigid and not attached to the walls of the first container 2 or of the security container cassette 1. The sheet is preferably arranged between the second container and the separating wall 20.

The security container cassette 1 may also comprise third containers 27 preferably inside the second containers 22. The third containers 27 may consist of tubular glass elements, such as test tubes or vials or containers or something else. They may comprise marking or tracing elements inside them, e.g. rare-earth elements defining a code designed to identify the origin of the container cassette 1 itself. Alternatively, the third containers 27 may comprise catalysts or similar substances inside them, e.g. for an adhesive or to enhance the performance of the liquid 28. In addition, the rupture elements 26 may comprise substances that are incompatible with the marking liquid and designed to improve safety performance.

The security container cassette 1 may also comprise rupture elements 26, preferably comprising breakable elements, e.g. glass and preferably placed inside the second container 22 so as to facilitate the rupture of the latter in the event of explosions and burglary attempts. For example, they may consist of glass sheets or they may consist of the same test tubes or vials as the third containers 27.

Figure 7:
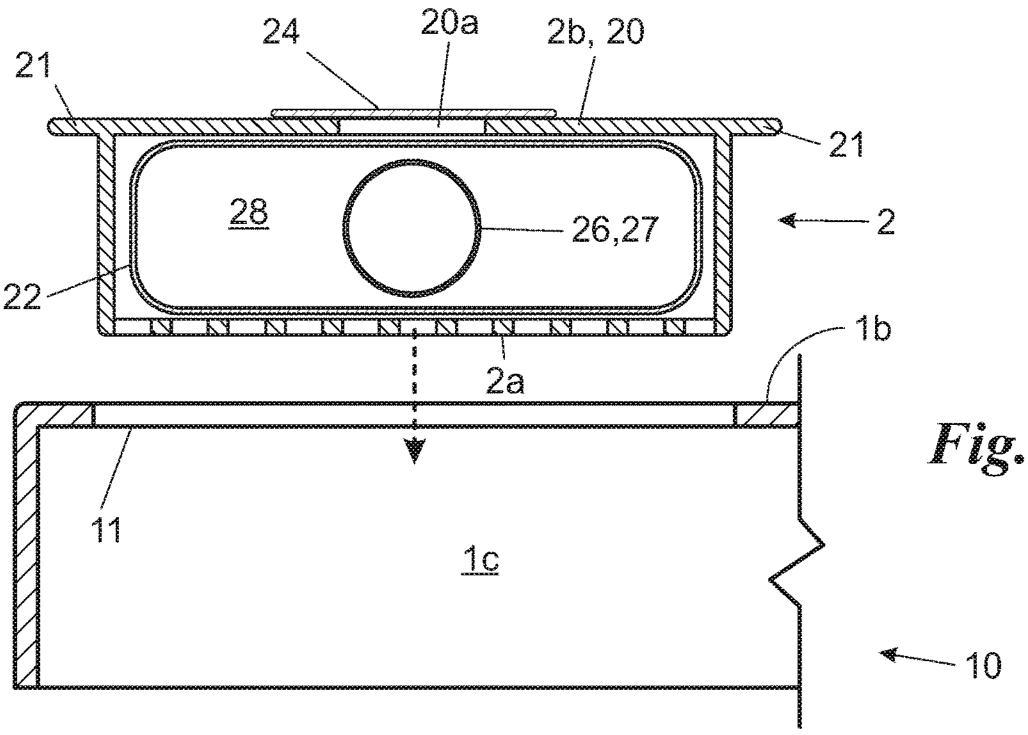
FIG. 7 shows a second embodiment in cross-section of a portion of the security container cassette for banknotes and values according to the invention.
Figure 4A:
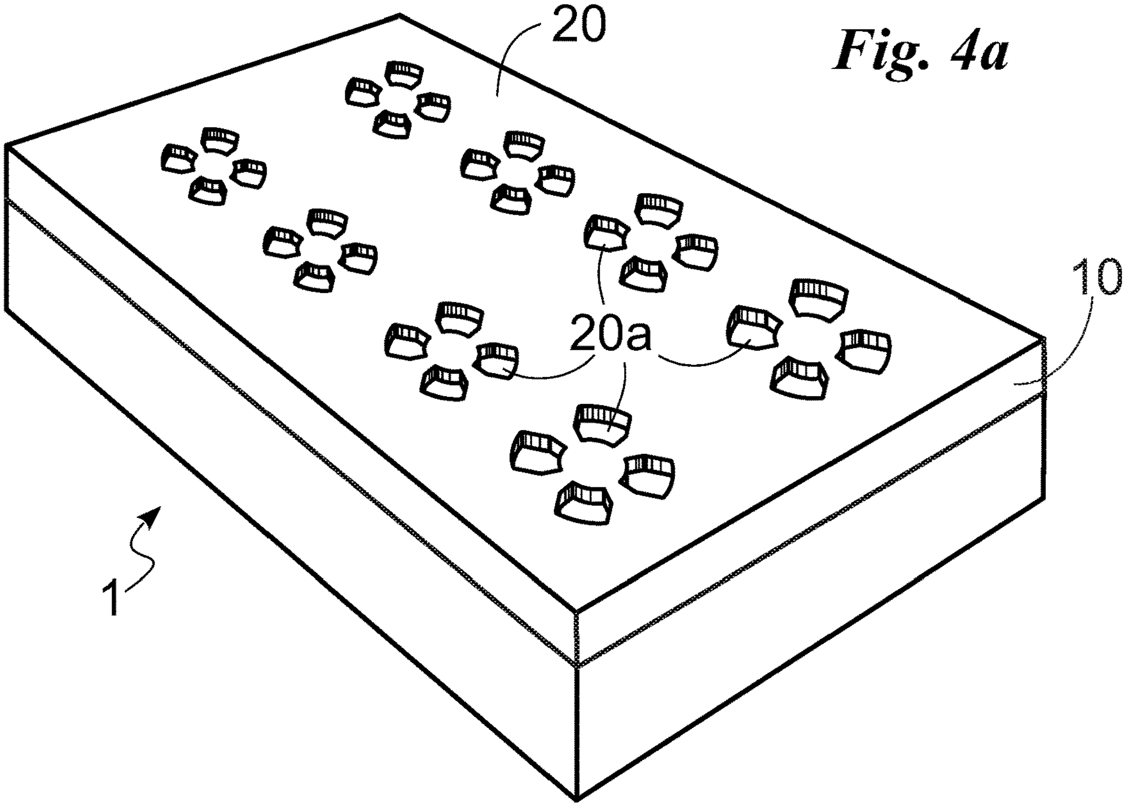
FIG. 4A shows a first example of the upper portion of a security container cassette for banknotes and values according to the invention.
Figure 4B:
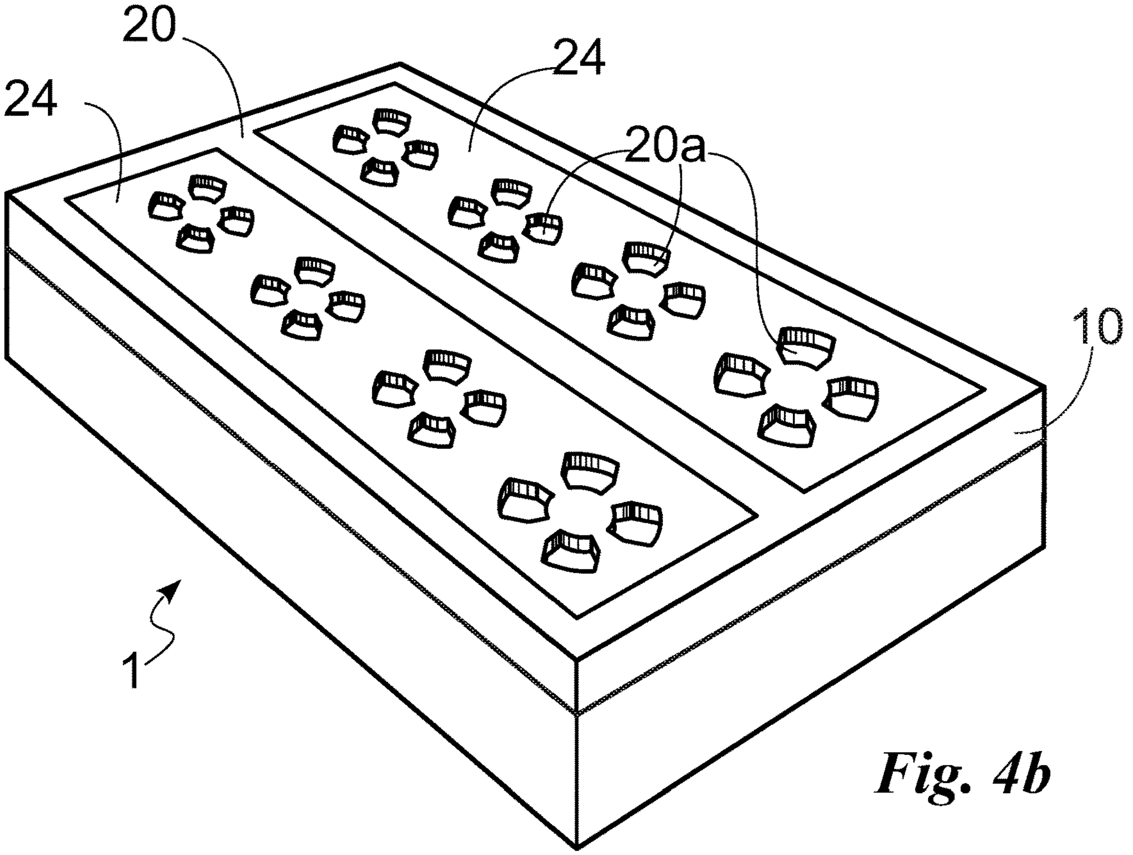
FIG. 4*b* shows a second example of the upper portion of a security container cassette for banknotes and values according to the invention.

The implementation or construction of said container cassette 1 can innovatively and preferably take place through the modification of an existing cassette, in particular of the lid 10, or the implementation as described and illustrated below in the cross-section and exploded view of the half lid in FIG. 7.

For example, a conventional lid 10 can be provided with at least one, and preferably two, openings 11. These openings 11 are preferably through openings and are preferably basically shaped like the projection on the lid itself of the first containers 2.

The first containers 2 can, therefore, be made separately from the lids 10. In this case, the first containers 2 can be equipped with connection flanges 21, designed to firmly attach to the lid 10, by means of connection means such as screws or glues. The first containers 2, thus made, may comprise all the elements described above, such as one or more of the following: the second containers 22, the passage windows or weakened upper portions 20, and/or all the other elements described in this text.

In this case, or in the other cases described in this text, the first containers 2 may comprise an upper sheet 21*a* at least partially made of rigid material that is easily ruptured and/or broken, such as glass and the like, which constitutes at least part of the upper portion 2*b*. For example, the upper sheet 21*a* can form the whole upper portion 2*b*, except for the connection flanges 21. In this case, the upper sheet 21*a* can be connected to the remaining portion of the first containers 2, in particular to the side walls, by means of longitudinal supports 21*b*, protruding towards the inside of the first container 2, as shown in FIG. 8.

The banknote 50 dispenser could also comprise an active marking system to mark the banknotes and values in the event of a burglary.

The term "active" means, as in current usage, that the marking does not take place if there are no appropriate means. On the contrary, the marking preferably caused by the ink contained in the first containers 2 is passive, because it is implemented by rupturing the first containers 2, a rupture that occurs mechanically during the action of explosive substances without the use of electric sensors or actuators.

The active marking system may comprise: active means for conveying a marking fluid to said banknotes and values, and burglary sensors functionally designed to activate the active conveying means. The latter are known in themselves and preferably consist of one or more of the following sensors: tilt sensors, accelerometers, inclination sensors, temperature sensors, gas sensors, and the like.

The active marking system is preferably of the type described in the Italian patent MI2001A000946, of the applicant itself.

The operation of the security container cassette 1 described above in structural terms, is as follows.

The banknote 50 dispenser, in which the container cassette 1 is installed and used in a known way, and the first containers 2 or cassettes are loaded and used in the conventional way.

In the event of a burglary, particularly in the event of an explosion, the pressure wave passes through the weakened portions 20*a* or holes, easily rupturing or passing through them.

The shock wave of the explosion then immediately reaches the second containers 22, rupturing them against the lower portion 2*a* of the first containers 2. This rupture is facilitated by the sheets, by said cutting elements, and by the rupture elements 26 that enable, the first, to distribute the force over the whole second container 22, rupturing it in an advantageous and homogeneous way, and, the second and third, to facilitate the cutting of the container.

The marking liquid is then projected onto the banknotes and values by marking them.

In any case, the marking liquid is partly distributed along the different main portions 22*a* of the second container 22, partly transferred, due to pressurisation and the like, between the different main portions 22*a*, and partly remains temporarily confined to the single different main portions 22*a* since the passage portions 22*b* have reduced passage sections.

The security container cassette 1 according to the invention achieves important advantages.

In fact, the passage windows or weakened portions 20*a* enable the explosion to immediately reach the second containers 22 rupturing them. On the contrary, in the prior art described, the pressure wave of the explosions was dampened and hindered by the walls of the cassettes or containers in general.

The other elements, and in particular, the second container 22, which is divided into main portions 22*a*, also improves the effectiveness of the container cassette 1.

Variations may be made to the invention that fall within the scope of the inventive concept defined in the claims. In this context, all details can be replaced by equivalent elements, and the materials, shapes, and dimensions may be any materials, shapes, and dimensions.

The invention claimed is:

1. A security container cassette for banknotes or values for Cash machines, ATM, and the like, defining an internal volume and comprising:

a first container arranged in said internal volume and close to said banknotes and values and comprising a lower portion, facing said banknotes or values, which is permeable to fluids, a second, fluid-tight container for marking fluid that is contained in said first container and is of a pliable type that is easily ruptured in the event of pressurisation from explosions or the like, wherein said second container is divided into a plurality of main portions, wherein said main portions are mutually connected, in fluidic connection, by passage portions, wherein said passage portions have a smaller passage section than sections inside said main portions, and wherein said passage portions comprise welds inside said second container between two opposite flaps.

2. The security container cassette according to claim 1, wherein said security container cassette comprises perimeter boundary walls comprising a base and an upper wall, opposite and parallel to said base, wherein said perimeter boundary walls define the internal volume of the cassette, the upper wall is a peripheral wall of the security container cassette.

3. The security container cassette according to claim 2, wherein said first container is housed, or defined, inside the container cassette, near, or in contact with, the upper wall.

4. The security container cassette according to claim 2, wherein said upper wall structurally forms part of the first container.

5. The security container cassette according to claim 1, wherein said passage portions are defined by passage reducers inside said second container.

6. The security container cassette according to claim 1, comprising at least one third container, placed inside said second container.

7. The security container cassette according to claim 1, comprising rupture elements, placed inside said second container and designed to facilitate the rupture of said second container in the event of explosions.

8. The security container cassette according to claim 7, wherein said rupture elements comprises breakable elements.

9. The security container cassette according to claim 1, wherein said first container is arranged close to an external portion of said security container cassette, said first container having an internal volume separated from said external portion by means of at least one separating wall, wherein said separating wall comprises passage windows or weakened upper portions.

10. The security container cassette according to claim 8, wherein said rupture elements comprises glass.

11. The security container cassette according to claim 2, wherein said upper wall is part of a lid of the security container cassette.

12. The security container cassette according to claim 2, wherein the lower portion is at least partially rigid, permeable to fluids at least on the side facing the banknotes and values, and made of metal or polymer sheets comprising holes and/or openings.

13. The security container cassette according to claim 2, wherein said second container comprises a membrane that can easily be ruptured in case of pressurisation from explosions or the like.

14. The security container cassette according to claim 9, wherein said weakened upper portions are adapted and configured to rupture when pressurized during explosions and the like so a shock wave of the explosion directly pressurizes the marking fluid inside the first container.

15. A security container cassette for banknotes or values for Cash machines, ATM, and the like, defining an internal volume and comprising:

a first container arranged in said internal volume and close to said banknotes and values and comprising a lower portion, facing said banknotes or values, which is permeable to fluids, a second, fluid-tight container for marking fluid that is contained in said first container and is of a pliable type that is easily ruptured in the event of pressurisation from explosions or the like, wherein said second container is divided into a plurality of main portions, wherein said main portions are mutually connected, in fluidic connection, by passage portions, wherein said passage portions have a smaller passage section than sections inside said main portions, and comprising at least one third container, placed inside said second container.

16. The security container cassette according to claim 15, wherein said security container cassette comprises perimeter boundary walls comprising a base and an upper wall, opposite and parallel to said base, wherein said perimeter boundary walls define the internal volume of the cassette, the upper wall is a peripheral wall of the security container cassette.

17. The security container cassette according to claim 15, comprising rupture elements, placed inside said second container and designed to facilitate the rupture of said second container in the event of explosions.

18. A security container cassette for banknotes or values for Cash machines, ATM, and the like, defining an internal volume and comprising:

a first container arranged in said internal volume and close to said banknotes and values and comprising a lower portion, facing said banknotes or values, which is permeable to fluids, a second, fluid-tight container for marking fluid that is contained in said first container and is of a pliable type that is easily ruptured in the event of pressurisation from explosions or the like, wherein said second container is divided into a plurality of main portions, wherein said main portions are mutually connected, in fluidic connection, by passage portions, wherein said passage portions have a smaller passage section than sections inside said main portions, wherein said security container cassette comprises perimeter boundary walls comprising a base and an upper wall, opposite and parallel to said base, wherein said perimeter boundary walls define the internal volume of the cassette, the upper wall is a peripheral wall of the security container cassette, and wherein the lower portion is at least partially rigid, permeable to fluids at least on the side facing the banknotes and values, and made of metal or polymer sheets comprising holes and/or openings.

19. The security container cassette according to claim 18, wherein said security container cassette comprises perimeter boundary walls comprising a base and an upper wall, opposite and parallel to said base, wherein said perimeter boundary walls define the internal volume of the cassette, the upper wall is a peripheral wall of the security container cassette.

20. The security container cassette according to claim 18, comprising rupture elements, placed inside said second container and designed to facilitate the rupture of said second container in the event of explosions.

* * * * *